US010222205B2

(12) United States Patent
Li et al.

(10) Patent No.: US 10,222,205 B2
(45) Date of Patent: Mar. 5, 2019

(54) METHOD AND APPARATUS FOR DETERMINING SIZE INFORMATION OF FOOD INGREDIENTS

(71) Applicant: KONINKLIJKE PHILIPS N.V., Eindhoven (NL)

(72) Inventors: Wei Li, Eindhoven (NL); Bin Yin, Eindhoven (NL); Zhongchi Luo, Eindhoven (NL); Mo Li, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 48 days.

(21) Appl. No.: 15/109,169

(22) PCT Filed: Dec. 3, 2015

(86) PCT No.: PCT/EP2015/078434
§ 371 (c)(1),
(2) Date: Jun. 30, 2016

(87) PCT Pub. No.: WO2016/096442
PCT Pub. Date: Jun. 23, 2016

(65) Prior Publication Data
US 2017/0336200 A1 Nov. 23, 2017

(30) Foreign Application Priority Data

Dec. 17, 2014 (WO) ................ PCT/CN2014/001136
Mar. 20, 2015 (EP) .................................... 15159999

(51) Int. Cl.
G01B 15/04 (2006.01)
G01B 15/02 (2006.01)
H05B 6/64 (2006.01)
H05B 6/68 (2006.01)
H05B 6/70 (2006.01)

(52) U.S. Cl.
CPC ............. G01B 15/04 (2013.01); G01B 15/02 (2013.01); H05B 6/6467 (2013.01); H05B 6/68 (2013.01); H05B 6/705 (2013.01); Y02B 40/146 (2013.01)

(58) Field of Classification Search
CPC ...... G01N 29/032; G01B 15/04; G01B 15/02; H05B 6/6467; H05B 6/68; H05B 6/705
See application file for complete search history.

(56) References Cited

U.S. PATENT DOCUMENTS

| 5,546,179 A * | 8/1996 | Cheng .................. G01B 11/255 250/559.22 |
| 2006/0151486 A1 * | 7/2006 | Jung .................... H05B 6/6464 219/708 |
| 2013/0027060 A1 * | 1/2013 | Tralshawala ........... G01N 33/02 324/643 |
| 2013/0080098 A1 | 3/2013 | Hadad | |

FOREIGN PATENT DOCUMENTS

| DE | 10063692 A1 | 7/2002 |
| DE | 102012006578 A1 | 10/2013 |

(Continued)

OTHER PUBLICATIONS

Vyacheslav V. Komarov. Handbook of dielectric and thermal properties of materials at microwave frequencies. Artech House, 2012.

(Continued)

Primary Examiner — Kyle R Quigley

(57) ABSTRACT

The invention relates to a method and apparatus for determining a size information of food ingredients. The method comprises a step of applying (110) to the food ingredients an electrical field having a given radio frequency, the electrical field being generated by a source positioned in close proximity to the food ingredients, a first step of measuring (120) a ratio between the energy of the electrical field reflected from the food ingredients, and the energy of the electrical field generated by said source and applied to the food ingredients. The method also comprises a first step of determining (130), based on said ratio, an average thickness of the food ingredients along the direction of the electrical field applied to the food ingredients. The method also comprises a second step of measuring (140), for a plurality of distances between the source of the electrical field and the (Continued)

food ingredients, the ratio (R2) between the energy of the electrical field reflected from the food ingredients, and the energy of the electrical field applied to the food ingredients. The method further comprises a step of identifying (150) a relatively sudden change in the amplitude of the ratios measured by said second step of measuring (140) and a step of deriving (160) the corresponding distance between the source of the electrical field and the food ingredients for which said relatively sudden change occurred. The method also comprises a second step of determining (170), based on said corresponding distance and the divergent angle of the electrical field irradiating at said corresponding distance, an average diameter of the food ingredients in a plane perpendicular to the direction of the electrical field applied to the food ingredients. This invention results in a more convenient, robust and accurate way to determine the average thickness of the food ingredients.

14 Claims, 7 Drawing Sheets

(56) References Cited

FOREIGN PATENT DOCUMENTS

| | | |
|---|---|---|
| DE | 102012011165 A1 | 12/2013 |
| JP | 2905017 B2 | 6/1999 |

OTHER PUBLICATIONS

N.P. Brunton et al., "Meat Science", vol. 72 (2006) 236-244.

\* cited by examiner ial field having a given radio frequency, the electrical field is generated by a source positioned in close proximity to the food ingredients; measuring a ratio between the energy of the electrical field reflected from the food ingredients, and the energy of the electrical field generated by the source and applied to the food ingredients; and determining, based on the ratio, an average thickness of the food ingredients along the direction of the electrical field applied to the food ingredients. The method also comprises measuring, for a plurality of distances between the source of the electrical field and the food ingredients, the ratio between the energy of the electrical field reflected from the food ingredients, and the energy of the electrical field applied to the food ingredients; identifying a relatively sudden change in the amplitude of the measured ratios; deriving the corresponding distance between the source of the electrical field and the food ingredients for which the relatively sudden change occurred; and determining, based on the corresponding distance and the divergent angle of the electrical field irradiating at the corresponding distance, an average diameter of the food ingredients in a plane perpendicular to the direction of the electrical field applied to the food ingredients.

METHOD AND APPARATUS FOR DETERMINING SIZE INFORMATION OF FOOD INGREDIENTS

This application is the U.S. National Phase application under 35 U.S.C. § 371 of International Application No. PCT/EP2015/078434, filed on Dec. 3, 2015, which claims the benefit of International Application No. 15159999.0 filed on Mar. 20, 2015 and International Application No. PCT/CN2014/001136 filed Dec. 17, 2014. These applications are hereby incorporated by reference herein.

FIELD OF THE INVENTION

The present technology relates to the field of food preparation, particularly to a method for determining size information of food ingredients by radio frequency. The technology also relates to an apparatus, a cooking device and a computer readable storage medium for performing the method.

BACKGROUND OF THE INVENTION

Currently, home cooking control largely relies on the user's experiences for setting various cooking parameters, such as time duration and heating power. Some known cooking appliances determine the cooking process parameters by using information inputted by user, such as the food type or the food size, based on an 'average' food model. In both cases, a non-optimal cooking result is often encountered due to errors from user inputs or a significant discrepancy between the actual food and the 'average' food model used by the cooking appliance.

DE102012011165A1 discloses a device with a radio transmitter for transmitting electromagnetic waves and a radio receiver for detecting the electromagnetic waves. The attenuation of the electromagnetic waves is detected by an evaluation unit. A characteristic of an object is determined from the detected attenuation. The characteristic of the object is selected from the presence of the object in a predetermined spatial region, phase state, material composition, temperature or speed of the object.

US2013/027060A1 discloses a calorie estimating device for measuring a calorie content of a food item. The device comprises a transmitter antenna configured to transmit ultra-wide band signals to at least a portion of the food item. The ultra-wide band signals are detected and analyzed to determine a thickness of the food item.

JP2905017B2 discloses a device for reducing a thawing irregularity of a food item and for automatically thawing said food item using a thawing plate. The device comprises a light emitting unit for irradiating an infrared ray and a photosensor for receiving the infrared ray. The light emitting unit and the photosensor are configured to detect a thickness of the food item.

SUMMARY OF THE INVENTION

It is an object of the present disclosure to solve or alleviate at least one of the problems mentioned above.

The object of the present invention is solved by the subject-matter of the independent claims, wherein further embodiments are incorporated in the dependent claims.

A first aspect of the present disclosure relates to a method of determining a size information of food ingredients. The method comprises applying to the food ingredients an electrical field having a given radio frequency, the electrical field Through determining the average thickness of the food ingredients without the need for the user to manually input size information of the food ingredients, this method results in a more convenient, robust and accurate way to determine the average thickness of the food ingredients. Since the determined average thickness of the food ingredients is closer to the actual thickness of the food ingredients than via the above-mentioned prior art solutions, the process for cooking the food ingredients can be set more accurately based on the size information of the food ingredients.

A second aspect of the present disclosure relates to an apparatus configured to determine a size information of food ingredients. The apparatus comprises a first unit, a second unit and a third unit. The first unit is adapted to apply to the food ingredients an electrical field having a given radio frequency, the electrical field is generated by a source positioned in close proximity to the food ingredients. The second unit is adapted to measure a ratio between the energy of the electrical field reflected from the food ingredients, and the energy of the electrical field generated by said source and applied to the food ingredients. The third unit is adapted to determine, based on the ratio, an average thickness of the food ingredients along the direction of the electrical field applied to the food ingredients. The apparatus further comprises a fourth unit, a fifth unit, a sixth unit and a seventh unit. The fourth unit is adapted to measure, for a plurality of distances between the source of the electrical field and the food ingredients, the ratio between the energy of the electrical field reflected from the food ingredients, and the energy of the electrical field applied to the food ingredients. The fifth unit is adapted to identify a relatively sudden change in the amplitude of the ratios measured by said fourth unit. The sixth unit is adapted to derive the corresponding distance between the source of the electrical field and the food ingredients for which said relatively sudden change occurred. The seventh unit is adapted to determine, based on said corresponding distance and the divergent angle of the electrical field irradiating at said corresponding distance, an average diameter of the food ingredients in a plane perpendicular to the direction of the electrical field applied to the food ingredients.

This apparatus implements functional units to carry out the above method according to the invention.

A third aspect of the present disclosure relates to a cooking device. The cooking device comprises an apparatus configured to determine a size information of food ingredients as described above.

A fourth aspect of the present disclosure relates to a computer readable storage medium storing instructions. When executed on an apparatus, the instructions cause the apparatus to perform the steps of the method as described above.

BRIEF DESCRIPTION OF THE DRAWINGS

The technology will now be described, by way of example, based on embodiments with reference to the accompanying drawings, wherein.

DETAILED DESCRIPTION OF EMBODIMENTS

Figure 1:
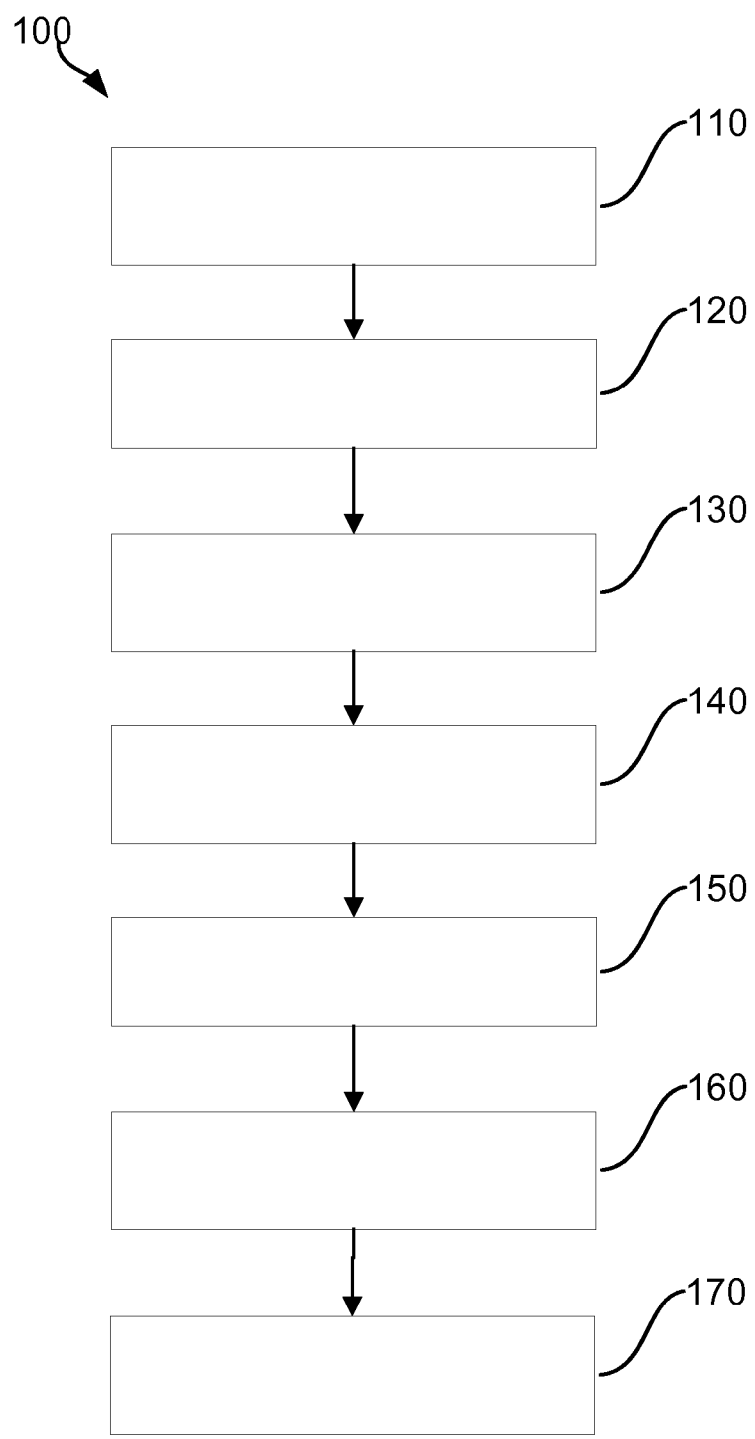
FIG. 1 illustrates a flowchart of a method in accordance with an embodiment.

Embodiments herein will be described more fully hereinafter with reference to the accompanying drawings. The embodiments herein can, however, be embodied in many different forms and should not be construed as limiting the scope of the appended claims. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program according to the present embodiments. It is understood that blocks of the block diagrams and/or flowchart illustrations, and combinations of blocks in the block diagrams and/or flowchart illustrations, can be implemented by computer program instructions. These computer program instructions can be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology can be embodied in hardware and/or in software (including firmware, resident software, micro-code, etc.). Furthermore, the present technology can take the form of a computer program on a computer-usable or computer-readable storage medium having computer-usable or computer-readable program code embodied in the medium for use by or in connection with an instruction execution system. In the context of this document, a computer-usable or computer-readable storage medium can be any medium that can contain, store, or is adapted to communicate the program for use by or in connection with the instruction execution system, apparatus, or device.

Embodiments herein will be described below with reference to the drawings.

FIG. 1 illustrates a flowchart of a method 100 of determining size and area information of food ingredients.

The method 100 comprises a step of applying 110 to the food ingredients an electrical field having a given radio frequency. The electrical field is generated by a source positioned in close proximity to the food ingredients. Generally, the given radio frequency ranges from 1 MHz to 50 GHz. Preferably, the given radio frequency has a frequency and power such that the corresponding electrical field generated by the source can pass through the food ingredients. The source generating the electrical field, for example, is a directional antenna that emits the radio frequency signal so as to apply the electrical field to the food ingredients. The size information comprises the average thickness of the food ingredients. In order to determine the average thickness accurately, it is desirable to position the source generating the electrical field as close to the surface of the food as possible. Typically, the distance between the source generating the electrical field and the food ingredients is such that the food ingredient can be regarded as of infinite size in the direction perpendicular to the propagation of the applied field, and thus majority of emitted radio frequency energy can be regarded as being irradiated into the food ingredient.

The method also comprises a first step of measuring 120 a ratio R1 between the energy of the electrical field reflected from the food ingredients, and the energy of the electrical field generated by the source and applied to the food ingredients. The ratio is for example quantified by scattering parameter, such as, but not limited to $S_{11}$. In this case, the energy of the radio frequency electrical field reflected from the food ingredients is, for example, represented by the amplitude of the electrical field reflected from the food ingredients. Preferably, the energy of the electrical field reflected from the food ingredients is measured by the same source generating the electrical field and the food ingredients. Similarly, the energy of the radio frequency electrical field applied to the food ingredients is, for example, represented by the amplitude of the electrical field applied to the food ingredients.

Figure 2:
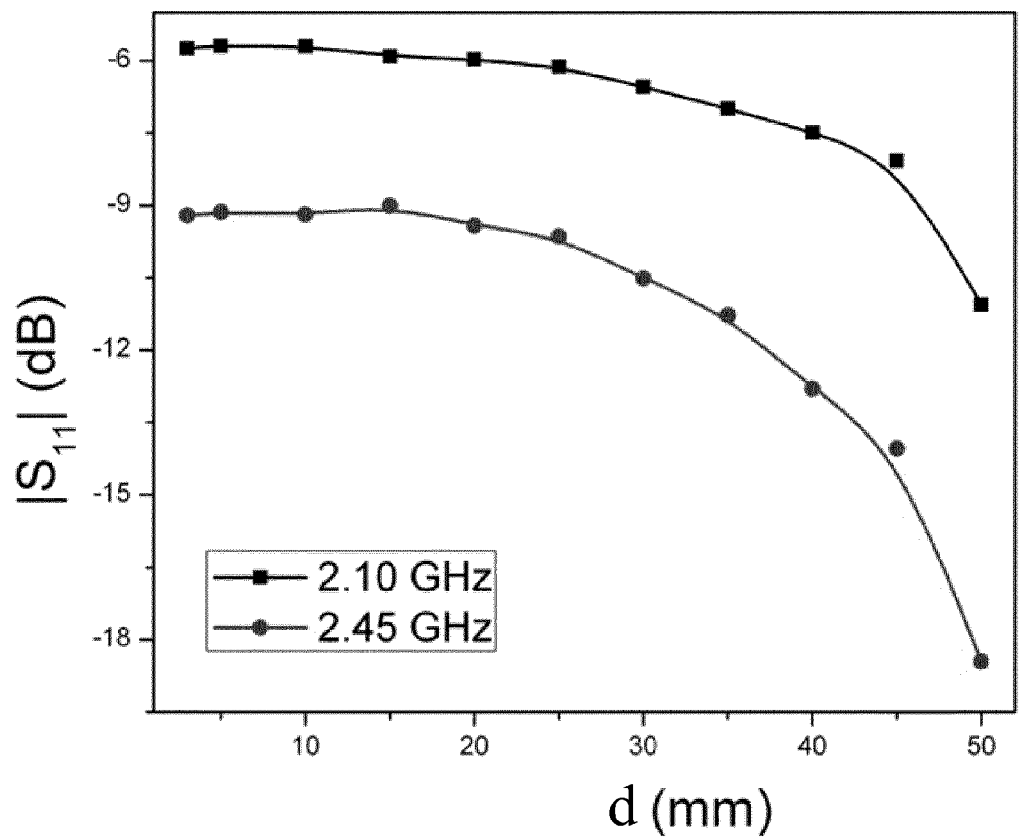
FIG. 2 is an exemplary diagram illustrating the relationship between the thickness of the food ingredients and the reflectance of the food ingredients to the radio frequency.

The method also comprises a first step of determining 130, based on the ratio R1, an average thickness d of the food ingredients along the direction of the electrical field applied to the food ingredients. As illustrated in FIG. 2, for a given radio frequency, there is a function relationship between the average thickness d of the food ingredients and the ratio R1, e.g. $S_{11}$, of the food ingredients. That is to say, the $S_{11}$ of the food ingredients and the average thickness of the food ingredients are linked by a given relation for a given radio frequency in the case that the source generating the given radio frequency is in close proximity to the food ingredients. Hence, once the ratio $S_{11}$ is measured, the average thickness can be determined.

Through determining the average thickness of the food ingredients without any manual user inputs, such as inputting the size information of the food ingredients manually, this method result in a more convenient, robust and accurate way to determine the average thickness of the food. Since the determined average thickness of the food ingredients is closer to the actual thickness of the food ingredients than via the above-mentioned prior art solutions, the process for cooking the food ingredients can be set more accurately based on the size information of the food ingredients.

Preferably, the first step of determining 130 comprises calculating the average thickness d of the food ingredients by the equation (1) as follows:

$$d = \left| \frac{1}{2k} \ln \left( \frac{1 - S_{11} \cdot \frac{1-\sqrt{\varepsilon}}{1+\sqrt{\varepsilon}}}{\frac{1-\sqrt{\varepsilon}}{1+\sqrt{\varepsilon}} + S_{11}} \right) \right|, \quad (1)$$

wherein ε is the complex dielectric value, k is the complex wave number, and $S_{11}$ is the ratio measured in the step of measuring 120.

ε can for example be calculated from the scattering parameter such as $S_{11}$ measured in a local part of the food ingredients. The local scattering parameter can be measured using a contact radio frequency probe such as a coaxial open-end probe. The contact radio frequency probe can be located at the bottom of the food ingredients. In particular, ε can be calculated by the equation as follows:

$$\varepsilon = \varepsilon' - j \cdot \varepsilon'' = \frac{\frac{(1-S_{11})}{(1+S_{11}) \cdot Z_0 \cdot j \cdot 2\pi \cdot f} - C_p}{C_g}$$

ε is the complex value with the real component of ε' and the imaginary component of ε". ε' is called the dielectric permittivity and ε" is called the loss factor. In the equation, both $C_p$ and $C_g$ are the characteristic capacitor constants of the contact radio frequency probe. Z0 is the characteristic impedance constant for the cable line of the probe. f is the given radio frequency.

Accordingly, the complex wave number k can be calculated by the equation as follows:

$$k = \frac{2\pi \cdot f}{\sqrt{2} \cdot c} \cdot \left( \sqrt{\sqrt{\varepsilon'^2 + \varepsilon''^2} + \varepsilon'} - j \cdot \sqrt{\sqrt{\varepsilon'^2 + \varepsilon''^2} - \varepsilon'} \right)$$

Here, c is light speed in vacuum, i.e. $3*10^8$ m/s. f is the given radio frequency.

Figure 4:
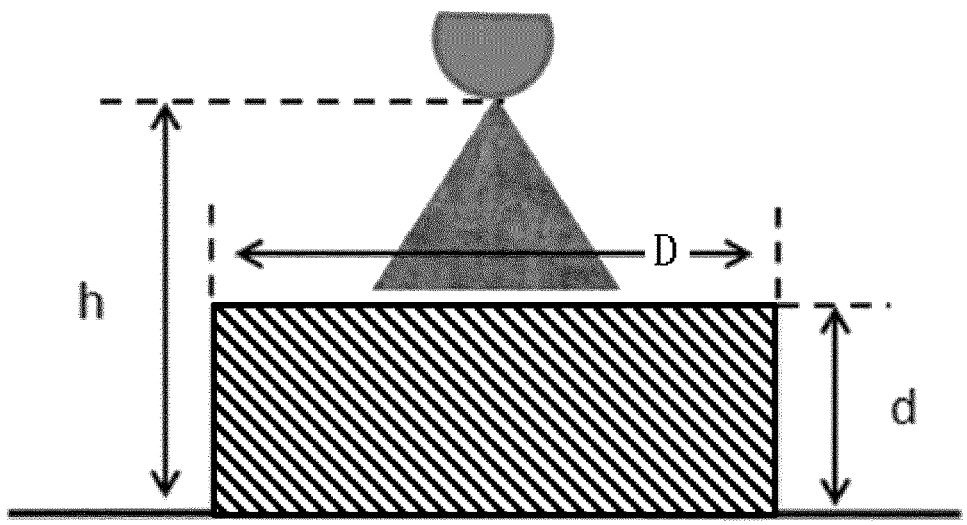
FIG. 4 illustrates a source generating an electrical field to the food ingredients which is used to measure the size information of the food ingredients.

To this end, the method also comprises a second step of measuring 140, for a plurality of distances between the source of the electrical field and the food ingredients, the ratio R2 between the energy of the electrical field reflected from the food ingredients, and the energy of the electrical field applied to the food ingredients. For example, as shown in FIG. 4, the source of electrical field is positioned on the top of the food. In the second step of measuring 140, the source of electrical field is gradually moved up away from the food ingredients. The value h is the distance from the source of the electrical field to the bottom of the food ingredients and the d value is the average thickness of the food ingredients. As such, the gap distance (h-d) between the source of the electrical field and the food, increases. In the moving, the second step of measuring 140 selects a plurality of gap distances and measures the ratio R2 between the energy of the electrical field reflected from the food ingredients, and the energy of the electrical field applied to the food ingredients at each of the plurality of gap distances. The ratio R2 is for example quantified by a scattering parameter, such as, but not limited to $S_{11}$.

The method also comprises a step of identifying 150 a relatively sudden change in the amplitude of the ratios R2 measured by the second step of measuring 140, and a step of deriving 160 the corresponding distance between the source of the electrical field and the food ingredients for which the relatively sudden change occurred.

Figure 5:
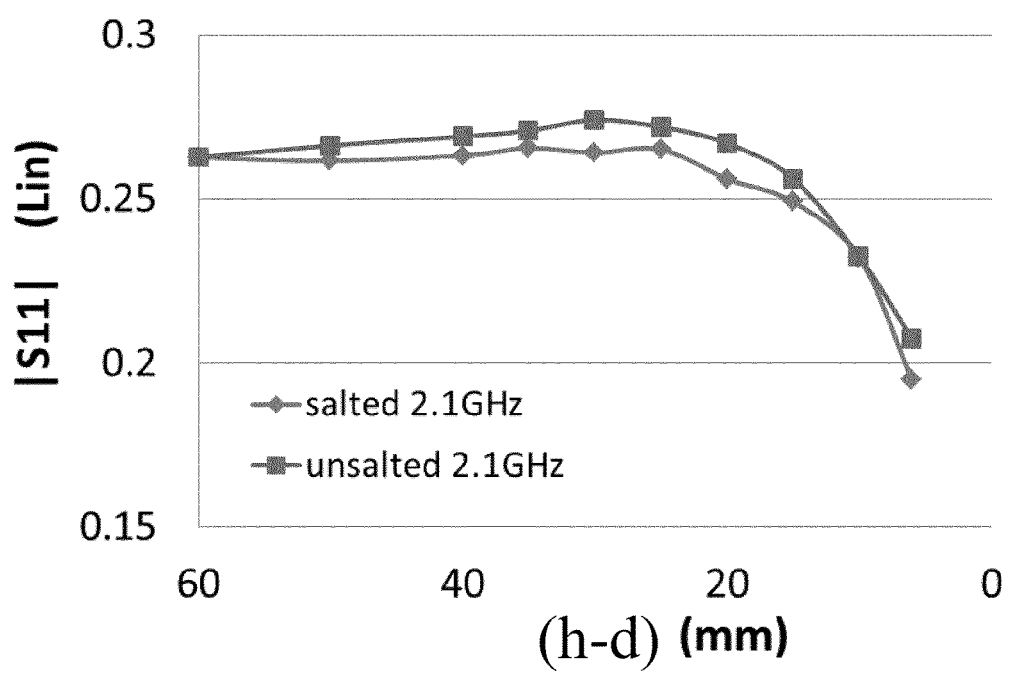
FIG. 5 is an exemplary diagram illustrating the relationship between the distance from the source of the electrical field to the food ingredients and the reflectance of the food ingredients to the radio frequency.

As shown in FIG. 5, with the increase of the gap distance between the source of the electrical field and the food ingredients, the ratio R2, i.e. $S_{11}$ value, of the food ingredients also increases. However, the increasing amplitudes of the $S_{11}$ value are different. As illustrated, when the gap distance is less than 20 mm, the increasing amplitude is sharp, for example the increasing amplitude is above a threshold. This is because that the area of the electrical field irradiating on the surface of the food ingredients increases with the increasing gap distance. When the gap distance is larger than 20 mm, the increasing amplitude is smooth, for example the increasing amplitude is below a threshold. This is because that the area of the electrical field has covered the whole surface of the food ingredients since the gap distance reaches 20 mm. In this case, it can be determined that the relatively sudden change in the amplitude of the measured ratios occurs when the area of the electrical fielding irritating the surface of the food ingredients is close to or equal to the area of the surface of the food ingredient. In this example, the corresponding distance, between the source of the electrical field and the food ingredients for which the relatively sudden change occurred, is 20 mm.

The method also comprises a second step of determining 170, based on the corresponding distance (h-d) and the divergent angle α of the electrical field irradiating at the corresponding distance, an average diameter D of the food ingredients in a plane perpendicular to the direction of the electrical field applied to the food ingredients. For example, the average diameter D of the food ingredients can be calculated by the equation (2) below:

$$D = 2 \times (h-d) \times \tan(\alpha) \quad (2)$$

The area of the surface of the food ingredients can thus be calculated based on the average diameter D. For example, if the surface of the food is assumed to circular-shaped, then the area A of the surface of the food ingredients is $$A = \prod \times \left(\frac{D}{2}\right)^2.$$

Preferably (not illustrated), the method further comprises a step of heating 180 the food ingredients. The heating is defined by a set of heating parameters taken among the set of parameters defined by heating power and heating duration. The method also comprises a step of tuning 190 the heating parameters based on the size information of the food ingredients. For example, the step of tuning 190 uses the average thickness d of food ingredients and/or the area A of the food ingredients as the input to set the heating power and heating duration. For example, the larger the thickness and/or the wider the area A, the longer the time duration of the cooking process, and/or the higher the heating power applied to the food ingredients during of the cooking process. For example, the heating power/heating duration vary linearly (i.e. proportionally) with the size information determined according to the invention.

Figure 7:
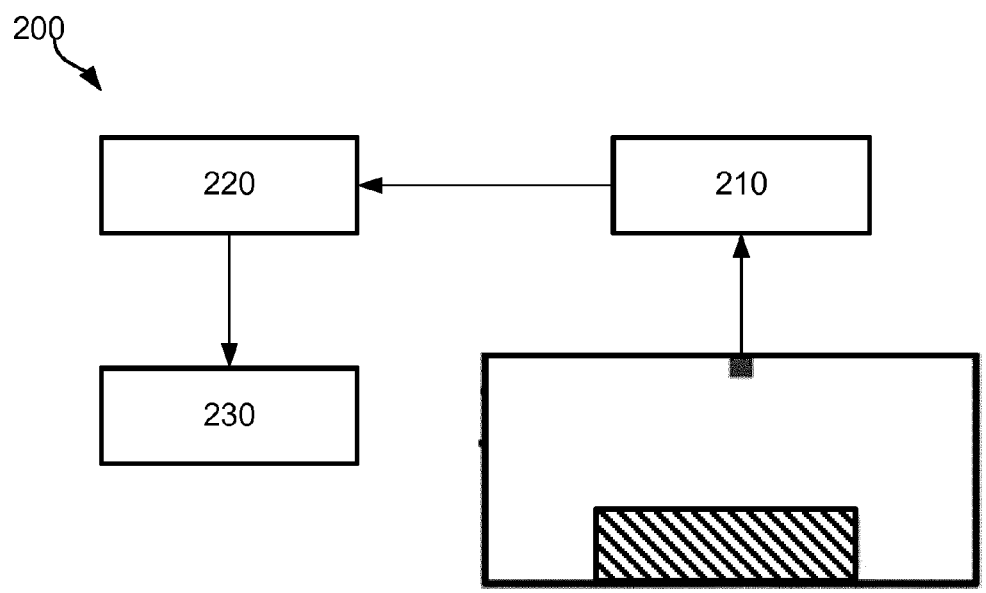
FIG. 7 schematically illustrates a block diagram of an apparatus configured to determine a size information of food ingredients in accordance with an embodiment.

FIG. 7 schematically illustrates a block diagram of an apparatus 200 configured to determine a size information of food ingredients in accordance with an embodiment. The apparatus 200 comprises various units to carry out the various steps of the method according to the invention described above. The apparatus 200 can be either independent or integrated into a cooking device. The apparatus 200 comprises a first unit 210, a second unit 220 and a third unit 230. The functions of the individual units will be discussed with reference to FIG. 7.

The first unit 210 is adapted to apply to the food ingredients, an electrical field having a given radio frequency. The electrical field is generated by a source positioned in close proximity to the food ingredients. The second unit 220 is adapted to measure a ratio R1 between the energy of the electrical field reflected from the food ingredients, and the energy of the electrical field generated by the source and applied to the food ingredients. The third unit 230 is adapted to determine, based on the ratio R1, an average thickness d of the food ingredients along the direction of the electrical field applied to the food ingredients.

Figure 3:
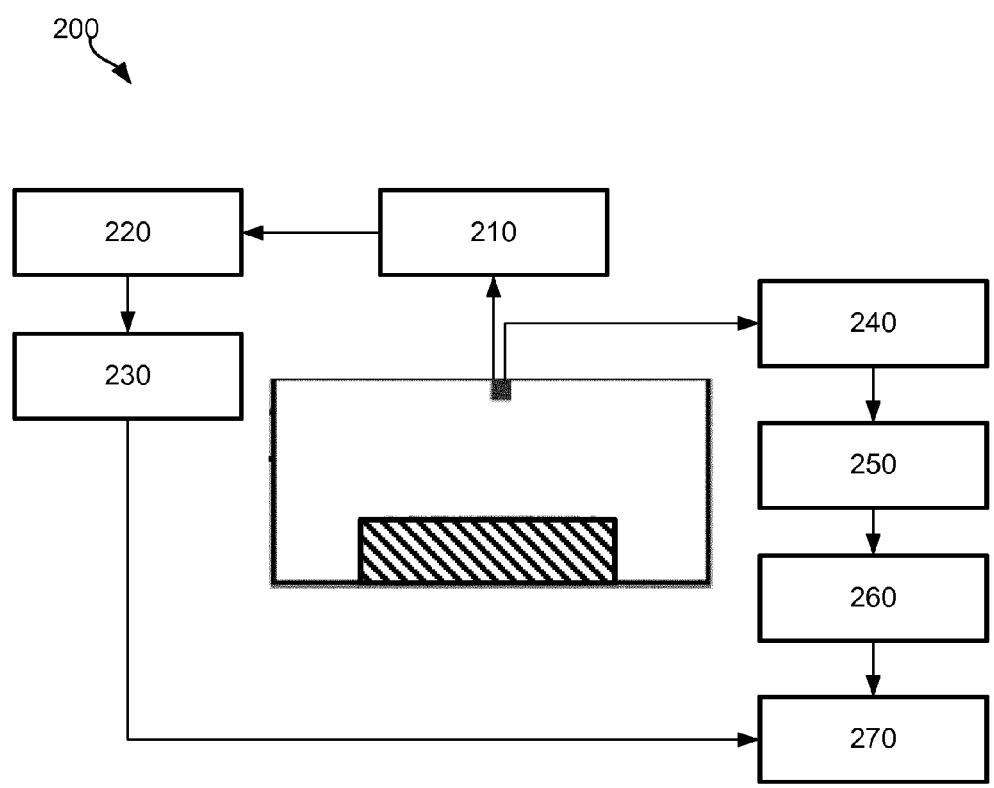
FIG. 3 schematically illustrates a block diagram of an apparatus configured to determine a size information of food ingredients in accordance with an embodiment.

The apparatus 200 also comprises the fourth unit 240, the fifth unit 250, the sixth unit 260 and the seventh unit 270, as illustrated in FIG. 3.

The fourth unit 240 is adapted to measure, for a plurality of distances between the source of the electrical field and the food ingredients, the ratio R2 between the energy of the electrical field reflected from the food ingredients, and the energy of the electrical field applied to the food ingredients. The fifth unit 250 is adapted to identify a relatively sudden change in the amplitude of the ratios R2 measured by the fourth unit 240. The sixth unit 260 is adapted to derive the corresponding distance between the source of the electrical field and the food ingredients for which the relatively sudden change occurred. The seventh unit 270 is adapted to determine, based on the corresponding distance (h−d) and the divergent angle α of the electrical field irradiating at the corresponding distance, an average diameter D of the food ingredients in a plane perpendicular to the direction of the electrical field applied to the food ingredients. For example, the average diameter D of the food ingredients can be calculated by the equation (2) above.

Figure 6:
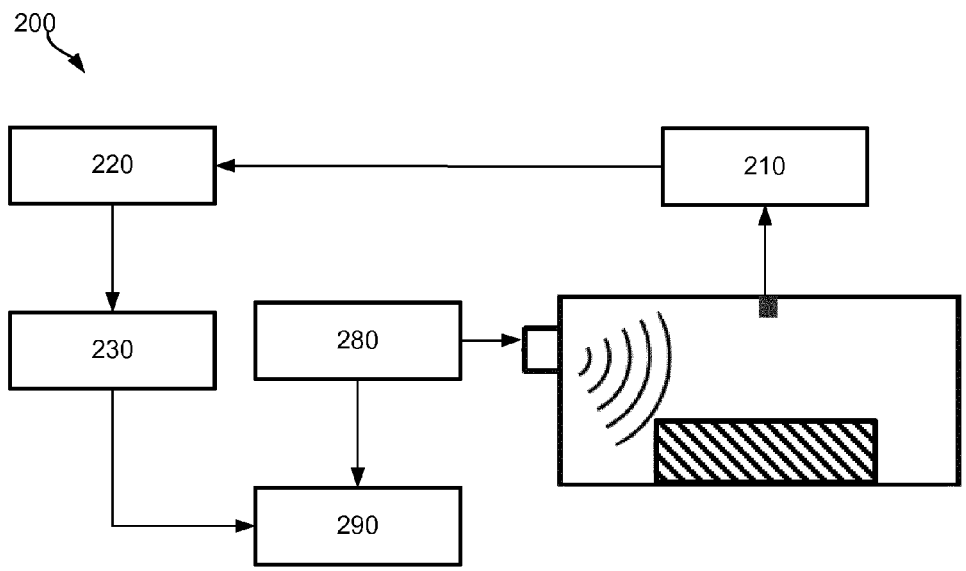
FIG. 6 schematically illustrates a block diagram of an apparatus configured to determine a size information of food ingredients in accordance with an embodiment.

Preferably, the apparatus 200 also comprises the eighth unit 280 and the ninth unit 290 as illustrated in FIG. 6.

The eighth unit 280 is adapted to heat the food ingredients. The heating is defined by a set of heating parameters taken among the set of parameters defined by heating power and heating duration. The ninth unit 290 is adapted to tune the heating parameters based on the size information of the food ingredients. For example, the ninth unit 290 uses the average thickness d of food ingredients and/or the area A of the food ingredients as the input to set the heating power and heating duration. For example, the larger the thickness and/or the wider the area A, the longer the time duration of the cooking process, and/or the higher the heating power applied to the food ingredients during of the cooking process. Heating of the food ingredients is for example done via a heating element generating heat convection or heat radiation.

The present disclosure also relates to a computer readable storage medium storing instructions. When executed on an apparatus, such as apparatus 200, the instructions cause the apparatus to perform the various steps of the method as described above.

While the embodiments have been illustrated and described herein, it will be understood by those skilled in the art that various changes and modifications may be made, any equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

What is claimed is:

1. A method of determining size information of food ingredients within a container, the method comprising:
   a step of applying to the food ingredients, via an electrical field generating source, an electrical field having a given radio frequency, wherein the electrical field generating source is positioned in close proximity to the food ingredients within the container;
   a first step of measuring, via a controller, a ratio (R1) between (i) an energy of the electrical field reflected from the food ingredients, and (ii) an energy of the electrical field applied to the food ingredients within the container;
   a first step of determining, via the controller, based on said ratio (R1), an average thickness (d) of the food ingredients along a direction of the electrical field applied to the food ingredients within the container;
   a second step of measuring, via the controller, for a gap distance between the electrical field generating source and the food ingredients within the container, a ratio (R2) between (i) the energy of the electrical field reflected from the food ingredients, and (ii) the energy of the electrical field applied to the food ingredients within the container;
   a step of increasing, via the controller, the gap distance between the electrical field generating source and the food ingredients within the container, and repeating the second step of measuring the ratio (R2) and the step of increasing the gap distance for each of a plurality of increasing gap distances;
   a step of identifying, via the controller, a relatively sudden change in an amplitude of ratios (R2) measured by said second step of measuring, wherein the relatively sudden change in the measured ratios (R2) occurs in response to (i) an area of the electrical field irradiating a surface of the food ingredients being close to or equal to (ii) an area of the surface of the food ingredients within the container;

a step of deriving, via the controller, a corresponding distance between the electrical field generating source and the food ingredients within the container for which said relatively sudden change occurred; and a second step of determining, via the controller, based on (i) said corresponding distance and (ii) a divergent angle (α) of the electrical field irradiating at said corresponding distance, an average diameter (D) of the food ingredients within the container in a plane perpendicular to the direction of the electrical field applied to the food ingredients.

2. The method of determining as claimed in claim 1, wherein the given radio frequency has a frequency and power such that a corresponding electrical field generated by the source can pass through the food ingredients.

3. The method of determining as claimed in claim 1, wherein the respective ratios (R1) and (R2) measured by the first step of measuring and the second step of measuring are quantified by a scattering parameter.

4. The method of determining as claimed in claim 1, wherein said first step of determining comprises calculating the average thickness (d) of the food ingredients by $$d = \left| \frac{1}{2k} \ln \left( \frac{1 - S_{11} \cdot \frac{1-\sqrt{\varepsilon}}{1+\sqrt{\varepsilon}}}{\frac{1-\sqrt{\varepsilon}}{1+\sqrt{\varepsilon}} + S_{11}} \right) \right|,$$

wherein ε is a complex dielectric value of the food ingredients, k is a complex wave number, and $S_{11}$ is the measured ratio (R1).

5. The method of determining as claimed in claim 4, wherein the complex dielectric value ε is calculated by:

$$\varepsilon = \varepsilon' - j \cdot \varepsilon'' = \frac{\frac{(1-S_{11})}{(1+S_{11}) \cdot Z_0 \cdot j \cdot 2\pi \cdot f} - C_p}{C_g}$$

wherein ε' is a dielectric permittivity and ε" is a loss factor, $C_p$ and $C_g$ are characteristic capacitor constants of a contact radio frequency probe located at a bottom of the food ingredients within the container, Z0 is a characteristic impedance constant for a cable line of the contact radio frequency probe, f is the given radio frequency, and $S_{11}$ is a local scattering parameter measured in a local part of the food ingredients using the contact radio frequency probe; and wherein the complex wave number k is calculated by:

$$k = \frac{2\pi \cdot f}{\sqrt{2} \cdot c} \cdot \left( \sqrt{\sqrt{\varepsilon'^2 + \varepsilon''^2} + \varepsilon'} - j \cdot \sqrt{\sqrt{\varepsilon'^2 + \varepsilon''^2} - \varepsilon'} \right)$$

wherein c is light speed in a vacuum.

6. The method of determining as claimed in claim 1, wherein said second step of determining comprises calculating the average diameter (D) of the food ingredients by an equation:

$$D = 2 \times (h-d) \times \tan(\alpha)$$

wherein h is a distance from the electrical field generating source to a bottom of the food ingredients within the container for which said relatively sudden change occurred, d is the average thickness of the food ingredients, and α is the divergent angle of the electrical field.

7. A method of heating food ingredients, comprising the steps of the method of determining a size information of food ingredients as claimed in claim 1 and further comprising:

a step of tuning, via the controller, one or more heating parameters of a set of heating parameters taken among a set of parameters defined by heating power and heating duration of a heating element, wherein the tuning is based on the size information of the food ingredients within the container; and a step of heating, via the heating element, the food ingredients within the container using the one or more tuned heating parameters.

8. The method of determining as claimed in claim 1, wherein said given radio frequency is selected in a range from 1 MHz to 50 GHz.

9. A non-transitory computer readable storage medium storing instructions which, when executed on an apparatus, cause the apparatus to perform the steps of the method according to claim 1.

10. An apparatus configured to determine size information of food ingredients within a container, the apparatus comprising:

a first unit for applying to the food ingredients, via an electrical field generating source, an electrical field having a given radio frequency, wherein the electrical field generating source is positioned in close proximity to the food ingredients within the container;

a second unit for measuring a ratio (R1) between (i) an energy of the electrical field reflected from the food ingredients, and (ii) an energy of the electrical field applied to the food ingredients within the container;

a third unit for determining, based on said ratio (R1), an average thickness (d) of the food ingredients along a direction of the electrical field applied to the food ingredients within the container;

a fourth unit for measuring, for a gap distance between the electrical field generating source and the food ingredients within the container, a ratio (R2) between (i) the energy of the electrical field reflected from the food ingredients, and (ii) the energy of the electrical field applied to the food ingredients within the container, wherein the fourth unit is further configured for increasing the gap distance between the electrical field generating source and the food ingredients within the container, and for repeating the measuring of the ratio (R2) and the increasing of the gap distance for each of a plurality of increasing gap distances;

a fifth unit for identifying a relatively sudden change in an amplitude of ratios (R2) measured by said fourth unit, wherein the relatively sudden change in the measured ratios (R2) occurs in response to (i) an area of the electrical field irradiating a surface of the food ingredients being close to or equal to (ii) an area of the surface of the food ingredients within the container;

a sixth unit for deriving a corresponding distance between the electrical field generating source and the food ingredients within the container for which said relatively sudden change occurred; and a seventh unit for determining, based on (i) said corresponding distance and (ii) a divergent angle (α) of the electrical field irradiating at said corresponding distance, an average diameter (D) of the food ingredients within the container in a plane perpendicular to the direction of the electrical field applied to the food ingredients.

11. The apparatus as claimed in claim 10, wherein the given radio frequency has a frequency and power such that a corresponding electrical field generated by the source can pass through the food ingredients.

12. The apparatus as claimed in claim 10, wherein the respective ratios (R1) and (R2) measured by the second unit and the fourth unit are quantified by a scattering parameter.

13. The apparatus as claimed in claim 10, further comprising:
- an eighth unit for heating the food ingredients within the container, wherein the heating of the food ingredients is defined by a set of heating parameters taken among a set of parameters defined by heating power and heating duration, and
- a ninth unit for tuning the heating parameters based on the size information of the food ingredients within the container.

14. A cooking device comprising an apparatus configured to determine a size information of food ingredients according to claim 10, the cooking device further comprising:
- a heating element; and
- a controller configured for tuning one or more heating parameters of a set of heating parameters taken among a set of parameters defined by heating power and heating duration of the heating element, wherein the tuning is based on the size information of the food ingredients within the container, and wherein the heating element is configured to heat the food ingredients within the container based on the one or more tuned heating parameters.

* * * * *